(12) United States Patent
Hashimoto et al.

(10) Patent No.: US 8,490,265 B2
(45) Date of Patent: Jul. 23, 2013

(54) METHOD AND APPARATUS FOR MANUFACTURING BRAKE, AND METHOD AND APPARATUS FOR INSPECTING BRAKE

(75) Inventors: Yukio Hashimoto, Tokyo (JP); Masayoshi Kojima, Tokyo (JP); Katsunori Kinno, Tokyo (JP); Mitsuru Sato, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 1073 days.

(21) Appl. No.: 12/484,448

(22) Filed: Jun. 15, 2009

(65) Prior Publication Data

US 2009/0307892 A1    Dec. 17, 2009

(30) Foreign Application Priority Data

Jun. 17, 2008    (JP) ................. 2008-157911

(51) Int. Cl.
*B23Q 17/00* (2006.01)
(52) U.S. Cl.
USPC .......... 29/407.08; 29/450; 29/235; 29/407.05
(58) Field of Classification Search
USPC ................ 29/889, 235, 407.05, 407.08, 450
See application file for complete search history.

(56) References Cited

U.S. PATENT DOCUMENTS

2004/0116193 A1    6/2004    Toriumi et al.

FOREIGN PATENT DOCUMENTS

| JP | 3-24331 | 2/1991 |
| JP | 5-104347 | 4/1993 |
| JP | 6-238575 | 8/1994 |
| JP | 2002-327849 | 11/2002 |
| JP | 2004-138175 | 5/2004 |
| JP | 2004-190841 | 7/2004 |

*Primary Examiner* — David Bryant
*Assistant Examiner* — Moshe Wilensky
(74) *Attorney, Agent, or Firm* — Drinker Biddle & Reath LLP

(57) ABSTRACT

A brake includes an annular boot which can be expanded and contracted according to movements of a piston and is assembled to an opening part of a cylinder and to an annular groove on an outer peripheral face of the piston. The boot is assembled by: engaging one end of the boot with the opening part of the cylinder in a state where the piston is contained in the cylinder; moving the piston so that at least a part of the piston is withdrawn from the cylinder and that the other end of the boot is pressed by a pressing face of the piston; and fitting the other end of the boot into the annular groove of the piston, while a movable range of the other end of the boot is restricted by an expanding allowance of the boot whose one end is engaged with the opening part of the cylinder.

6 Claims, 13 Drawing Sheets

(S1)    (S2)    (S3)

FIG. 8A
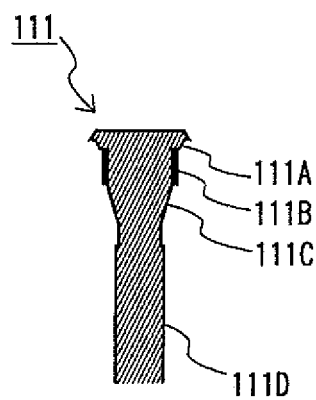
FIG. 8B
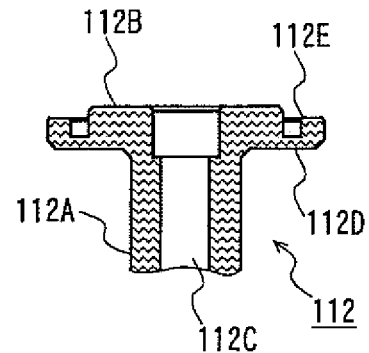
FIG. 8C
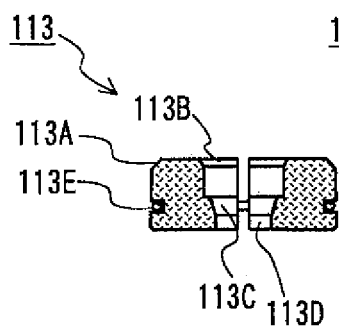 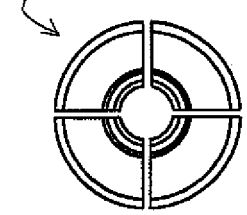
SIDE VIEW        TOP VIEW
FIG. 8D
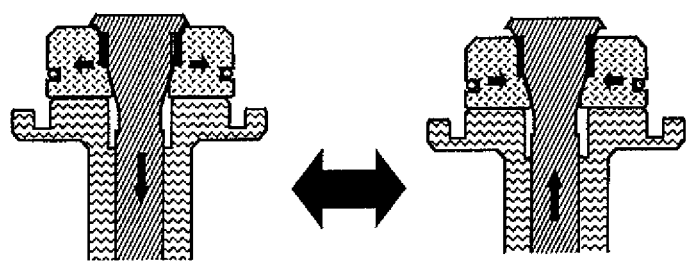
LATCHED STATE        UNLATCHED STATE

METHOD AND APPARATUS FOR MANUFACTURING BRAKE, AND METHOD AND APPARATUS FOR INSPECTING BRAKE

BACKGROUND OF THE INVENTION

1. Field of the Invention

The present invention relates to a method and an apparatus for manufacturing a brake, and a method and an apparatus for inspecting the brake, and more particularly, to an art for assembling a waterproof and dustproof boot to the brake, and an art for inspection.

2. Background Art

A hydraulic brake applies brake to a vehicle, by moving a brake pad when a piston slides in a cylinder. Recently, for preventing defective movements of the piston due to corrosion of a sliding face, the hydraulic brake is provided with a waterproof and dustproof boot for preventing intrusion of powder dust into a space between the piston and the cylinder.

For example, in Patent Document 1, there is disclosed a mold type dust boot provided with a ring for enhancing a fastening force with respect to a cylinder side. Moreover, in Patent Document 2, there is disclosed a mounting structure of a dust boot in which the dust boot can be easily mounted to a cylinder side, by providing a coil member in the dust boot by insert molding. Further, in Patent Document 3, there is disclosed an art for assembling a boot to a piston while an inner diameter of the boot is enlarged by a jig having a taper face, or an art for assembling the boot to the cylinder while an outer shape of the boot is diminished. Still further, in Patent Document 4, there is disclosed an art for assembling a waterproof and dustproof boot to a piston, while an inner diameter of the boot is enlarged by a slide block which is guided along a taper face to make a diameter enlarging movement.

In addition to the assembling methods disclosed in the above described Patent Documents, there are other assembling arts as described below. FIGS. 16 and 17 are views showing a method for assembling a waterproof and dustproof boot according to the conventional art. In the conventional art, a waterproof and dustproof boot mounting jig 1010 which includes a first jig 1011 for assembling an inner part of a waterproof and dustproof boot 1009 to a piston 1008, and a second jig 1012 for assembling an outer part of the boot 1009 to a cylinder body 1006, as shown in FIG. 16, has been used. The first jig 1011 is a jig which can move in an axial direction inside the second jig 1012, and can relatively move with respect to the second jig 1012. The first jig 1011 is urged upward by a spring (not shown) which is interposed between the first jig 1011 and the second jig 1012. The waterproof and dustproof boot mounting jig 1010 pushes up the waterproof and dustproof boot 1009, in a state where the boot is mounted thereon (S101 in FIG. 16). The waterproof and dustproof boot 1009 continues to be pushed up, until it is fitted to the cylinder body 1006 (S102 in FIG. 16). While the waterproof and dustproof boot 1009 continues to be pushed up, the first jig 1011 is brought into contact with the piston 1008 and its upward movement is stopped. However, the second jig 1012 continues to be pushed upward, while contracting the spring. By the way, in order that bellows of the waterproof and dustproof boot 1009 which is set between the cylinder body 1006 and the piston 1008 may not be inflated with air, the second jig 1012 is provided with an annular rib 1013 for pushing up the bellows. This annular rib 1013 keeps on moving upward having a lip part 1091 of the waterproof and dustproof boot 1009 interposed between the rib 1013 and the piston 1008. Finally, the lip part 1091 is firmly connected to the piston 1008 (S103 in FIG. 16). The waterproof and dustproof boot mounting jig 1010 continues to be pushed up, and the second jig 1012 pushes the outer part of the waterproof and dustproof boot 1009 to press it against the cylinder body 1006 (S104 in FIG. 17). On this occasion, the bellows come into a state caught between the rib 1013 and the cylinder body 106. When the second jig 1012 has completely finished pushing up the outer part of the waterproof and dustproof boot 1009, the assembly of the waterproof and dustproof boot 1009 is completed (S105 in FIG. 17).

[Patent Document 1] JP-A-2002-327849
[Patent Document 2] JP-A-2004-190841
[Patent Document 3] JP-A-06-238575
[Patent Document 4] JP-A-05-104347

In case of the conventional assembling arts as described above, the boot is liable to be damaged with a pushing motion or the like during the assembling work, and moreover, it is difficult to inspect air tightness of the boot.

SUMMARY OF THE INVENTION

One or more embodiments of the invention provide a method and an apparatus for easily conducting assembly and inspection of a waterproof and dustproof boot in a disk brake.

According to one or more embodiments of the invention, the piston is withdrawn from the cylinder in a state where one end of the boot is fitted to an opening part of the cylinder.

In accordance with a method of manufacturing a brake in one or more embodiments of the invention, a brake in which an annular boot which can be expanded and contracted according to movements of a piston of a hydraulic brake is assembled to an opening part of a cylinder and to an annular groove on an outer peripheral face of the piston is manufactured by: engaging one end of the boot with the opening part of the cylinder in a state where the piston is contained in the cylinder; moving the piston so that at least a part of the piston is withdrawn from the cylinder and that the other end of the boot is pressed by a pressing face of the piston; and fitting the other end of the boot into the annular groove of the piston, while a movable range of the other end of the boot is restricted by an expanding allowance of the boot whose one end is engaged with the opening part of the cylinder.

The waterproof and dustproof boot of the hydraulic brake is so formed as to be expanded and contracted according to the movements of the piston in order to follow a protruding amount of the piston from the cylinder which varies in correspondence with an amount of a wear of a brake pad. However, because there is an upper limit in the amount of the wear of the brake pad, an expanding allowance of the boot is set at a necessary smallest amount. Therefore, when the piston is remarkably protruded from the cylinder in a state where the waterproof and dustproof boot is engaged with both the cylinder and the piston of the brake, either of one end of the boot which is engaged with the cylinder and the other end of the boot which is engaged with the piston can be released from the engaged state. The above method for manufacturing the brake has been invented in view of such feature of the waterproof and dustproof boot.

Specifically, in the above described method for manufacturing the brake, when the waterproof and dustproof boot is assembled, the one end of the boot is engaged with the opening part of the cylinder. On this occasion, the piston is contained in the cylinder. The "one end of the boot" means the end which is fixed to the cylinder side, out of the opposite ends of the boot in an expanding and contracting direction, which is, for example, an edge part at an outer peripheral side of the annular boot. On the other hand, "the other end of the boot" means the end which is fixed to the piston side, out of the opposite ends of the boot in the expanding and contracting direction, which is, for example, an edge part at an inner peripheral side of the annular boot. An outer diameter of the piston is smaller than an inner diameter of the cylinder, and hence, the annular boot has a smaller diameter at the other end side, as compared with the one end side in the expanding and contracting direction. Therefore, when the piston is protruded from the cylinder in a state where the piston is contained in the cylinder and the boot is engaged with the opening part of the cylinder, the other end of the boot is pushed by the piston.

In the above described method for manufacturing the brake, the piston is moved in the state where the one end of the piston is engaged with the opening part of the cylinder, and at least a part of the piston is withdrawn from the cylinder. With this movement, the other end of the boot is pushed by the piston. In this case, because the expanding allowance of the boot is set at the necessary smallest amount, as described above, the expanding allowance of the boot is lost during the movement of the piston, and the other end of the boot will not follow the movement of the piston. While the movement of the piston is continued in this state, the other end of the boot whose movement is restricted due to the loss of the expanding allowance is enlarged in diameter in such a manner that its inner diameter is enlarged by the end of the piston, and the other end of the boot slides in along a peripheral side face of the piston. In this manner, the other end of the boot is fitted into the annular groove which is provided on the peripheral side face of the piston, whereby the boot is assembled to the cylinder and the piston.

As described, according to the method for manufacturing the brake in the one or more embodiments, it is possible to carry out the assembling work extremely easily, by decreasing the pushing motions in the assembling work.

Moreover, in the aforesaid fitting step, the other end of the boot may be fitted into the annular groove, by reversing a moving direction of the piston, after the piston has been moved until the other end of the boot passes the annular groove.

According to this feature, the other end of the boot is fitted into the annular groove which is provided in the piston in a state where the boot is not expanded, and hence, the other end of the boot will not be fitted into the groove in the piston in a curled state.

Moreover, in the aforesaid fitting step, a change of pressure in the cylinder may be monitored, after the piston has been moved to be separated from an oil seal which is provided on the cylinder, by pressurizing an inside of the cylinder, whereby presence or absence of trouble in the boot is judged according to the change of the pressure in the cylinder, and thereafter, the other end of the boot may be fitted into the annular groove, by reversing the moving direction of the piston.

Because a space between the cylinder and the piston which is partitioned with the boot and the oil seal is closed, it is difficult to test air-tightness of the boot by introducing a compressed air or the like into this space. On the other hand, because the cylinder is provided with an inlet or a bleeder hole, it is easily to raise the pressure in the cylinder. The above described method for manufacturing the brake has been invented in view of the position where the oil seal is provided, and the piston is moved up to the position where the space between the cylinder and the piston which is partitioned with the boot and the oil seal is communicated with an interior of the cylinder, in other words, the position where the piston is separated from the oil seal, and thereafter, the interior of the cylinder is pressurized. Then, the change of the pressure in the cylinder which has been pressurized is monitored, whereby the presence or absence of a trouble in the boot is judged.

Now, judgment of the trouble is described. Because the piston has been moved up to the position where the piston is separated from the oil seal, the compressed air supplied into the cylinder flows through a gap between the cylinder and the piston, and the air pressure in the cylinder is added to the boot. Accordingly, in case where there is some trouble in the boot or in assembling the boot, for example, in case where the boot is broken, or a gap is formed between the boot and the cylinder or between the boot and the piston, the air escapes from the relevant position. Accordingly, when the cylinder is kept as it is after the pressure in the cylinder has been raised, the pressure in the cylinder rapidly drops, in case where there is a trouble in the boot. On the other hand, in case where there is no trouble in the boot, the pressure in the cylinder is maintained, until at least a determined time passes. In the above described fitting step, the presence or absence of a trouble in the boot is judged on the basis of such a change of the pressure.

According to the above described method for manufacturing the brake, the presence or absence of a trouble in the boot in assembling the boot can be judged at the same time with the assembling work, and therefore, it is possible to enhance quality of the brake to be produced.

Moreover, in the aforesaid fitting step, after the pressure in the cylinder is reduced to be lower than the atmospheric pressure in a state where the piston is separated from the oil seal which is provided on the cylinder, the other end of the boot may be fitted into the annular groove by moving the piston, whereby the boot is assembled to the opening part and to the annular groove so that inflation of the boot due to pressure of the air remaining in a space between the boot and the oil seal may not occur.

As described above, the space between the cylinder and the piston which is partitioned with the boot and the oil seal is closed. Therefore, the boot is inflated toward a brake pad, in some cases, with the air remaining in this space, depending on a manner where the boot is assembled. Accordingly, in the above described method for manufacturing the brake, the pressure in the cylinder is reduced to prevent the inflation of the boot, in a state where the piston is at the position separated from the seal. When the piston is moved in a state where the pressure in the cylinder has been reduced, there is no air or an extremely small amount of air remains in the space, even though the space between the cylinder and the piston which is partitioned with the boot and the oil seal is closed, and hence, the inflation of the boot can be prevented.

Moreover, the boot may include a first annular part adapted to be fitted into the annular groove, a second annular part having a larger diameter than the first annular groove, and adapted to be engaged with the opening part of the cylinder, and an annular bellow part connecting the first annular part and the second annular part, wherein in the fitting step, at least a part of the piston which is contained in the cylinder is withdrawn from the cylinder in such a manner that the first annular part is pressed by the pressing face of the piston, and the first annular part of which a movable range is restricted by an expanding allowance of the bellow part of the boot may be fitted into the annular groove, in a state where the second annular part is engaged with the opening part. According to the boot having such structure, the first annular part and the second annular part are respectively engaged with the cylinder and the piston, and therefore, assembly of the boot by protruding the piston from the cylinder can be effectively realized.

Further, this invention can be understood from a viewpoint of an apparatus for manufacturing a brake. Specifically, according to one or more embodiments of the invention, in an apparatus for manufacturing a brake in which an annular boot which can be expanded and contracted according to movements of a piston of a hydraulic brake is assembled to an opening part of a cylinder and to an annular groove which is provided on an outer peripheral face of the piston, the apparatus may be provided with engaging means for engaging one end of the boot with the opening part in a state where the piston is contained in the cylinder, and fitting means for fitting the other end of the boot of which a movable range is restricted by an expanding allowance of the boot whose one end is engaged with the opening part into the annular groove, by moving the piston which is contained in the cylinder thereby to allow at least a part of the piston to be withdrawn from the cylinder, in such a manner that the other end of the boot is pressed by a pressing face of the piston.

Moreover, this invention can be understood from a viewpoint of a method for inspecting a brake. Specifically, according to one or more embodiments of the invention, in a method for inspecting a brake in which an annular boot which can be expanded and contracted according to movements of a piston of a hydraulic brake is assembled to an opening part of a cylinder and to an annular groove which is provided on an outer peripheral face of the piston, the method may be provided with a moving step for moving the piston until the piston is separated from an oil seal which is provided on the cylinder, by pressurizing an inside of the cylinder, and a judging step for monitoring a change of pressure in the cylinder in a state where the piston is separated from the oil seal which is provided on the cylinder, thereby to judge presence or absence of trouble in the boot according to the change of the pressure in the cylinder.

As described above, it is difficult to test the air-tightness of the boot by introducing a compressed air or the like into the space between the cylinder and the piston which is partitioned with the boot and the oil seal. The above described method for inspecting the brake is the method for inspecting such air-tightness of the brake, and has been invented in view of the position where the oil seal is provided, in the same manner as in the above described method for manufacturing the brake. Specifically, the piston is moved so that the space between the cylinder and the piston which is partitioned with the boot and the oil seal may be communicated with the interior of the cylinder, and thereafter, the interior of the cylinder is pressurized. Then, the change of the pressure in the cylinder which has been pressurized is monitored, whereby the presence or absence of a trouble in the boot is judged.

As described, according to the method for inspecting the brake, the presence or absence of the trouble in the boot which has been assembled to the cylinder can be judged, and hence, it is possible to enhance the quality of the brake.

Moreover, this invention can be understood from a viewpoint of an apparatus for inspecting a brake. Specifically, according to one or more embodiments of the invention, in an apparatus for inspecting a brake in which an annular boot which can be expanded and contracted according to movements of a piston of a hydraulic brake is assembled to an opening part of a cylinder and to an annular groove which is provided on an outer peripheral face of the piston, the apparatus may be provided with moving means for moving the piston until the piston is separated from an oil seal which is provided on the cylinder, by pressurizing an inside of the cylinder, and judging means for monitoring a change of pressure in the cylinder in a state where the piston is separated from the oil seal which is provided on the cylinder, thereby to judge presence or absence of trouble in the boot according to the change of the pressure in the cylinder.

According to the invention, it is possible to easily conduct assembly and inspection of a waterproof and dustproof boot to a disk brake.

Other aspects and advantages of the invention will be apparent from the following description, the drawings and the claims.

BRIEF DESCRIPTION OF THE DRAWINGS

FIG. 8A is a view showing a shaft.

FIG. 8B is a view showing a supporting rod.

FIG. 8C is a view showing a top.

FIG. 8D is a view showing movements of the top.

DETAILED DESCRIPTION OF THE EXEMPLARY EMBODIMENTS

Figure 1:
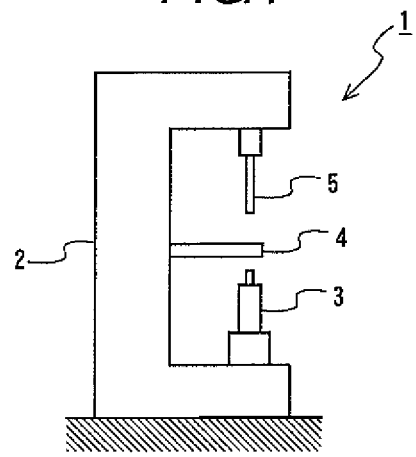
FIG. 1 is a view showing an entire structure of a disk brake manufacturing apparatus.

Exemplary embodiments of the invention will be described in an illustrative manner. FIG. 1 is a view showing an entire structure of an apparatus 1 for manufacturing a brake according to an embodiment of the invention. As shown in FIG. 1, the brake manufacturing apparatus 1 includes a body part 2, a jig actuating part 3, a cylinder body supporting part 4, and an air controlling part 5 (corresponds to the fitting means in this invention). The body part 2 has an outer shape of C-shape, and supports the jig actuating part 3, the cylinder body supporting part 4, and the air controlling part 5. Various auxiliary devices such as an air compressor for supplying a compressed air, a vacuum pump for vacuum suction, which are not shown, and a control computer are incorporated in the body part 2. A relay circuit for controlling supply of the compressed air and the vacuum suction by the air controlling part 5, and instruments such as a pressure sensor for monitoring a pressure of the air which has been supplied to a cylinder body are also provided in the body part 2. The cylinder body supporting part 4 is a table-like member for supporting the cylinder body which has been produced in a preceding production process and set thereon, and constructed in such a manner that the cylinder body can be held in a state where its opening side is directed downward. The jig actuating part 3 is an extending and contracting device which can hold a jig which will be described below so as to move it up and down. The jig actuating part 3 is disposed below the cylinder body supporting part 4 so as to be extended upward. Accordingly, the jig actuating part 3 can push up the jig which has been held thereon toward the cylinder body on the cylinder body supporting part 4. The air controlling part 5 is a device for forwarding the compressed air which has been supplied from the auxiliary device incorporated in the body part 2 to the cylinder body, and for conducting vacuum suction of the air in the cylinder body. The air controlling part 5 is connected to an inlet, which is a hole for connecting a brake hose provided in the cylinder body, by way of an air passage.

Figure 2:
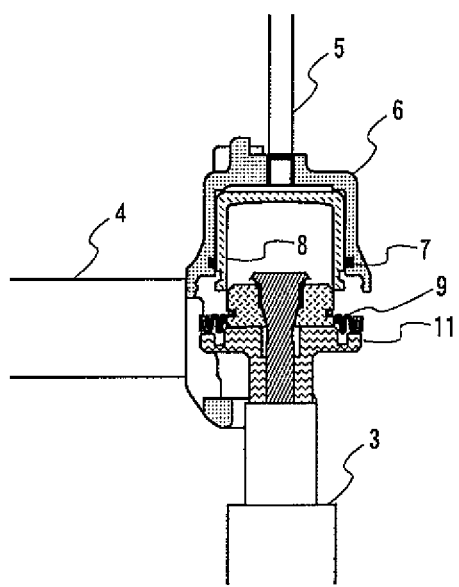
FIG. 2 is an enlarged view showing an essential part of the disk brake manufacturing apparatus.

FIG. 2 is an enlarged view of an essential part of a cylinder body 6 when it is set on the brake manufacturing apparatus 1. On this occasion, the cylinder body 6 which is set on the brake manufacturing apparatus 1 is at such a stage that a seal 7 has been assembled to the piston 8, and assembly of a waterproof and dustproof boot 9 for preventing intrusion of powder dust between the cylinder and the piston 8 is now being conducted. It is to be noted that a collet chuck 11 (corresponds to the engaging means in this invention), which will be described below, is attached to the jig actuating part 3.

Figure 3:
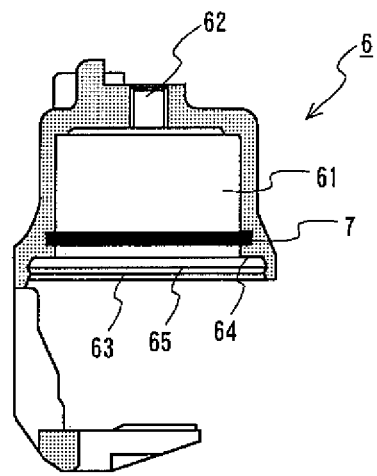
FIG. 3 is a view showing a cylinder body.

The cylinder body 6, piston 8, and the waterproof and dustproof boot 9 to be assembled by the brake manufacturing apparatus 1 according to the embodiment will be described in detail. FIG. 3 is a view showing the cylinder body 6. As shown in FIG. 3, the cylinder body 6 includes a cylinder inner diameter part 61, an inlet 62 which is a hole for controlling an oil pressure of brake oil in the cylinder inner diameter part 61, and the seal 7 for preventing a leak of the brake oil from a gap between the cylinder inner diameter part 61 and the piston 8. The air controlling part 5 is connected so that an air passage may be communicated with the cylinder inner diameter part 61 via this inlet 62. A bleeder hole, which is not shown, is closed. Moreover, the cylinder body 6 is provided with a cylinder groove 63 which is an annular groove provided near an opening part of the cylinder inner diameter part 61 so as to circumferentially run along an inner peripheral face thereof (corresponds to the opening part in the invention). Details of the cylinder groove 63 will be described below.

Figure 4:
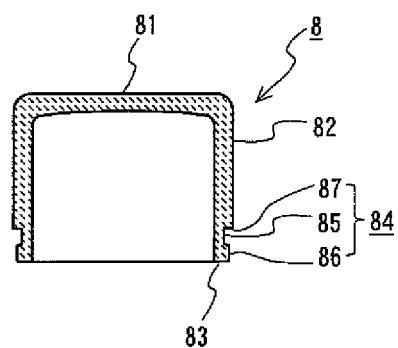
FIG. 4 is a view showing a piston.

FIG. 4 is a view showing the piston 8. As shown in FIG. 4, the piston 8 has a cylindrical outer shape which is open at a lower end side, and includes a pressure receiving face 81 for receiving the oil pressure of the brake oil, a peripheral side face 82 which slides while getting in touch with a wall face of the cylinder inner diameter part 61 via an oil slick, and a pressing face 83 which is butted against a pad of the disk brake thereby to press the pad against a brake rotor. Moreover, the piston 8 is provided with a piston groove 84 which is an annular groove provided near a lower end of the peripheral side face 82 so as to circumferentially run (corresponds to the annular groove in the invention). Details of the piston groove 84 will be described below.

Figure 5:
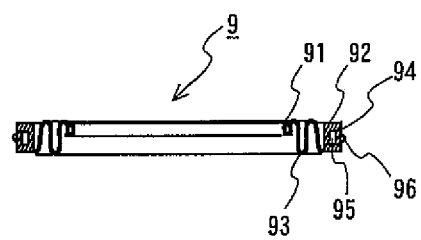
FIG. 5 is a view showing a waterproof and dustproof boot.

FIG. 5 is a view showing the waterproof and dustproof boot 9. As shown in FIG. 5, the waterproof and dustproof boot 9 is mainly formed of rubber which is elastic material, and includes a lip part 91 (the other end of the boot, and corresponds to the first annular part in the invention), a cylinder side fitting part 92 (the one end of the boot, and corresponds to the second annular part in the invention), and a bellow part 93 interconnecting the lip part 91 and the cylinder side fitting part 92. The lip part 91 is an annular member positioned most inward among constituent elements of the waterproof and dustproof boot 9 which has generally an annular outer shape. The lip part 91 has such a size as being fitted into the piston groove 84 of the piston 8. The cylinder side fitting part 92 which is an annular member like the lip part 91 and positioned most outward among the constituent elements of the waterproof and dustproof boot 9 has such a size as being fitted into the cylinder groove 63 of the cylinder inner diameter part 61. A metal ring 95 which will be described below is incorporated in the cylinder side fitting part 92. The bellow part 93 is a thin rubber member in a shape of bellows interconnecting the cylinder side fitting part 92 and the lip part 91. The bellow part 93 is so constructed that ribs which form undulations of the bellows run around along the cylinder side fitting part 92 and the lip part 91 in an annular shape, whereby relative movements of the cylinder side fitting part 92 and the lip part 91 are allowed, when they slide along a center axis relatively to each other. In case where the bellows are completely expanded due to excessive sliding movements of the two parts, an allowance is lost, and the relative movements of the two parts are restricted.

Figure 6:
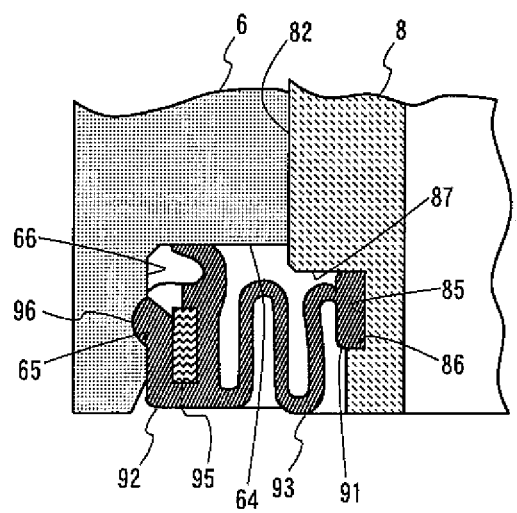
FIG. 6 is an enlarged view of the waterproof and dustproof boot in a mounted state.

FIG. 6 is an enlarged view showing an essential part of the waterproof and dustproof boot 9 which has been mounted to the cylinder body 6 and to the piston 8. As shown in FIG. 6, in the waterproof and dustproof boot 9, the cylinder side fitting part 92 is fitted into the cylinder groove 63, and the lip part 91 is fitted into the piston groove 84. In this embodiment, the cylinder groove 63 has a first peripheral wall face 66 which is a peripheral wall face in a circular shape to be brought into contact with an outer peripheral face of the cylinder side fitting part 92. This first peripheral wall face 66 is the peripheral wall face having an inner diameter slightly larger than the wall face of the cylinder inner diameter part 61. A holding recess 65 which is a groove for holding the cylinder side fitting part 92 is formed at an intermediate position of the first peripheral wall face 66. The holding recess 65 is the groove which is formed so as to circumferentially run along the first peripheral wall face 66, and is engraved in a round shape. The cylinder groove 63 has a first top face 64 to be brought into contact with an upper end of the cylinder side fitting part 92. When the cylinder side fitting part 92 is fitted into the cylinder groove 63, the first top face 64 comes into contact with the upper end of the cylinder side fitting part 92, whereby the movement of the cylinder side fitting part 92 is restricted, thereby to prevent the cylinder side fitting part 92 from being pushed into a deeper part than a determined mounting position.

The piston groove 84 has a second peripheral wall face 85 which is a peripheral wall face in a circular shape to be brought into contact with an inner peripheral face of the lip part 91. This second peripheral wall face 85 is the peripheral wall face having an outer diameter which is slightly smaller than the peripheral side face 82 of the piston 8. Moreover, the piston groove 84 has a second bottom face 86 which is continued from a lower end of the second peripheral wall face 85 and perpendicular to the second peripheral wall face 85, and a second top face 87 which is continued from an upper end of the second peripheral wall face 85 and perpendicular to the second peripheral wall face 85. When the lip part 91 is fitted into the piston groove 84, the second top face 87 comes into contact with the upper end of the lip part 91, whereby the movement of the lip part 91 is restricted, thereby to prevent the lip part 91 from being pushed into a deeper part than a determined mounting position. Moreover, the second bottom face 86 comes into contact with the lower part of the lip part 91 which is fitted into the piston groove 84, thereby to prevent the lip part 91 from being detached from the piston groove 84.

By the way, when rubber in an annular shape is enlarged in diameter, that is, when a ring formed of rubber is expanded, an enormous tension is applied to an object inside the ring. In the same manner, the lip part 91 applies a tension to the piston groove 84, and it is necessary to apply a force of a certain extent, when the lip part 91 is detached from the piston groove 84. On the other hand, when the rubber in an annular shape is reduced in diameter, that is, when the ring formed of rubber is narrowed, an elastic force applied to an object outside the ring is not so large due to deformation of the ring. In the same manner, the aforesaid cylinder side fitting part 92 applies an elastic force to the cylinder groove 63. Therefore, when the cylinder side fitting part 92 is detached from the cylinder groove 63, it can be detached with a relatively small force. For this reason, in the above described waterproof and dustproof boot 9, the metal ring 95 is embedded in the cylinder side fitting part 92 so that the cylinder side fitting part 92 may not be easily detached from the cylinder groove 63 of the cylinder body 6, even though the bellow part 93 is expanded and contracted with a movement of the piston 8. This metal ring 95 is molded at the same time when the waterproof and dustproof boot 9 is molded in a cavity. The metal ring 95 urges outward a round holding protuberance 96 in an annular shape which is provided on an outer peripheral side face of the cylinder side fitting part 92 thereby to keep the holding recess 65 and the holding protuberance 96 in an engaged state. In this manner, the cylinder side fitting part 92 will not easily drop from the cylinder groove 63.

Figure 7:
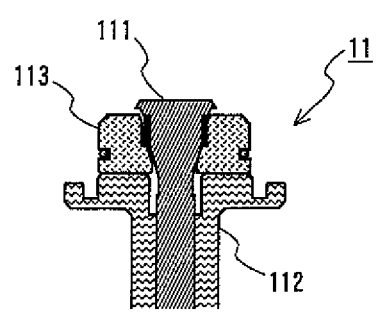
FIG. 7 is a view showing a collet chuck.

Then, a jig to be fitted to the jig actuating part 3 will be described. FIG. 7 is a view showing a collet chuck 11 as the jig. The collet chuck 11 is a jig for pushing the cylinder side fitting part 92 into the cylinder groove 63 and for actuating the piston 8, on occasion of mounting the waterproof and dustproof boot 9 to the cylinder body 6. As shown in FIG. 7, the collet chuck 11 includes a shaft 111 which is a rod in a columnar shape, and a supporting rod 112 which is a tubular rod through which the shaft 111 is inserted, and a top 113 which is mounted on an upper end of the supporting rod 112 and through which the shaft 111 is passed through.

FIG. 8A is a view showing the shaft 111. As shown in FIG. 8A, a plurality of faces in a stepwise shape are formed on a side face of the shaft 111. The shaft 111 includes an upper taper face 111A which is butted against the top 113 thereby to control a movement of the top 113, a lower taper face 111C, and a sliding face 111D which slides along an inner tubular face of the supporting rod 112. Control of the movement of the top 113 will be described below. A spring 111B which urges the top 113 downward is provided between the upper taper face 111A and the lower taper face 111C. A direction of relative movements of the shaft 111 and the supporting rod 112 is guided by the sliding face 111D, whereby their relative sliding movements in a vertical direction is realized.

FIG. 8B is a view showing the supporting rod 112. Only the upper end portion of the supporting rod 112 is shown in the drawing, and the other portion is omitted. The supporting rod 112 includes a hollow columnar portion 112A, and a disc-shaped portion 112B which is connected to the upper end of the cylindrical portion 112A. The columnar portion 112A is formed in a tubular shape and hence, it has an inner peripheral face 112C. The inner peripheral face 112C slides along the aforesaid slide face 111D, thereby to realize the relative sliding movements of the shaft 111 and the supporting rod 112. The disc-shaped portion 112B has an outer diameter which is substantially equal to an inner diameter of the lip part 91 of the waterproof and dustproof boot 9, and can be fitted into with the waterproof and dustproof boot 9 to hold it. Further, the disc-shaped portion 112B has a flange portion 112D which spreads laterally from a lower end of an outer peripheral side face thereof, and a skirt portion 112E in a shape of a peripheral wall, which is erected upward from an outer peripheral end of the flange portion 112D so as to circumferentially run along an outer periphery of the flange portion 112D. The skirt portion 112E is so constructed that its diameter is substantially equal to a diameter of the cylinder side fitting part 92 of the waterproof and dustproof boot 9, so that the skirt portion 112E can enter into the cylinder groove 63 while sliding along the first peripheral wall face 66. Moreover, the skirt portion 112E can support the cylinder side fitting part 92 of the waterproof and dustproof boot 9 from below, in a state where an upper end of the skirt portion 112E is butted against a lower face of the cylinder side fitting part 92.

FIG. 8C is views showing a side face and a top face of the top 113. As shown in FIG. 8C, the top 113 is composed of four members, which are fastened with an Q-ring 113E formed of spring steel having an expandable and contractible inner diameter. The four members of the top 113 are respectively provided with taper faces 113A for aligning a center axis of the collet chuck 11 with a center axis of the piston 8, when the collet chuck 11 is pushed up by the jig actuating part 3 and brought into contact with the piston 8. Moreover, the four members are provided with upper taper faces 113B to be butted against the upper taper face 111A of the shaft 111, and lower taper faces 113C to be butted against the lower taper face 111C of the shaft 111, in a hole for inserting the shaft 111 which is formed at a center of the top 113. When the shaft 111 is moved relatively with respect to the top 113, in a state where the upper taper faces 113B and the lower taper faces 113C provided on the four members which are urged with the O-ring 113E so as to be reduced in diameter are in contact with the upper taper face 111A and the lower taper face 111C, an outer diameter of the top 113 composed of the four members is contracted or enlarged. FIG. 8D shows such movement of the top 113. When the shaft 111 relatively slides downward with respect to the top 113, the outer diameter of the top 113 is enlarged. This state is hereinafter referred to as "a latched state". On the contrary, when the shaft 111 relatively slides upward with respect to the top 113, the outer diameter of the top 113 is contracted. This state is hereinafter referred to as "an unlatched state". In case where the top 113 is brought into the latched state or unlatched state, for the purpose of restricting the top 113 from moving up and down following the movement of the shaft 111, in other words, for the purpose of restricting relative movements of the top 113 and the support rod 112 in a vertical direction, the top 113 is pressed against the upper end face of the supporting rod 112 by means of the spring 111B which is provided on the shaft 111.

In the collet chuck 11 having the above described structure, the shaft 111 slides with respect to the supporting rod 112 in the vertical direction in a state where the supporting rod 112 is supported by the jig actuating part 3, whereby the top 113 can be brought into the latched state and the unlatched state. In the latched state, it is possible to hold the piston 8, and in the unlatched state, it is possible to release the piston 8. The relative movement of the shaft 111 with respect to the supporting rod 112 can be realized by adjusting pressure of controlling air which is supplied from the jig actuating part 3. Moreover, the fitting means in the invention is realized, by cooperation of the collet chuck 11, the jig actuating part 3 and the air controlling part 5.

Figure 9:
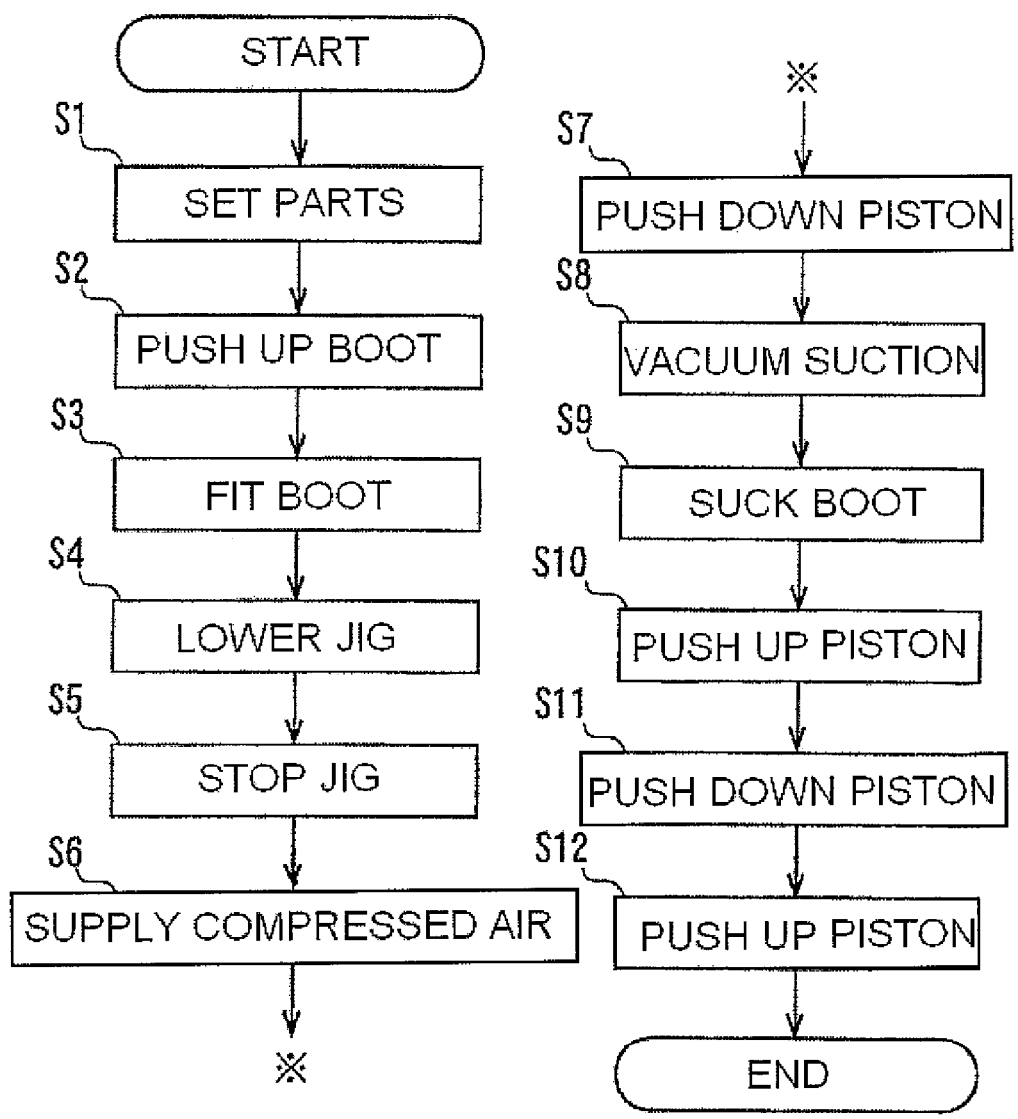
FIG. 9 is a flow chart showing steps for manufacturing the brake.
Figure 10:
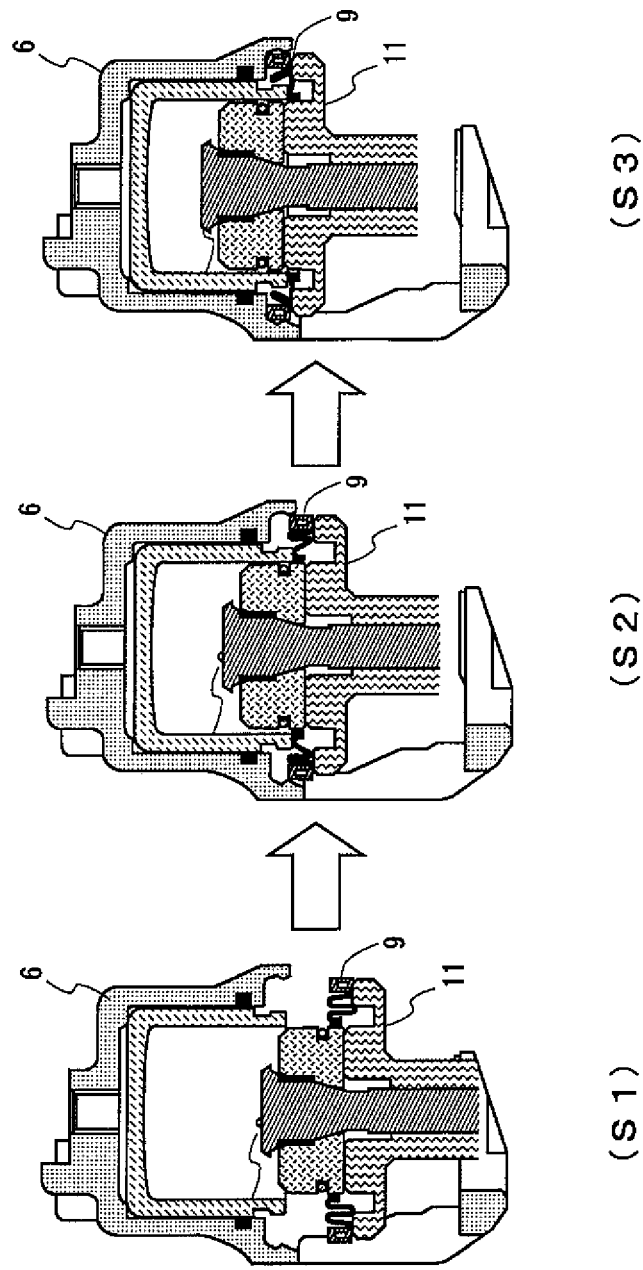
FIG. 10 is a view showing the steps for manufacturing the brake (S1 to S3).
Figure 11:
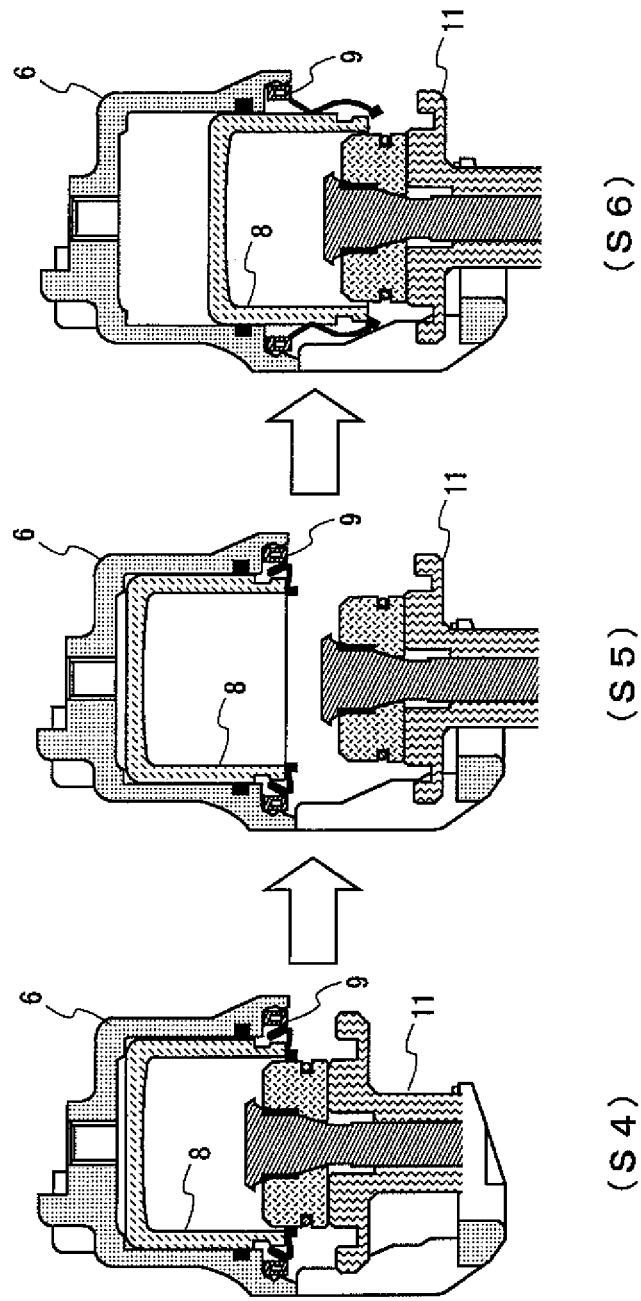
FIG. 11 is a view showing the steps for manufacturing the brake (S4 to S6).
Figure 12:
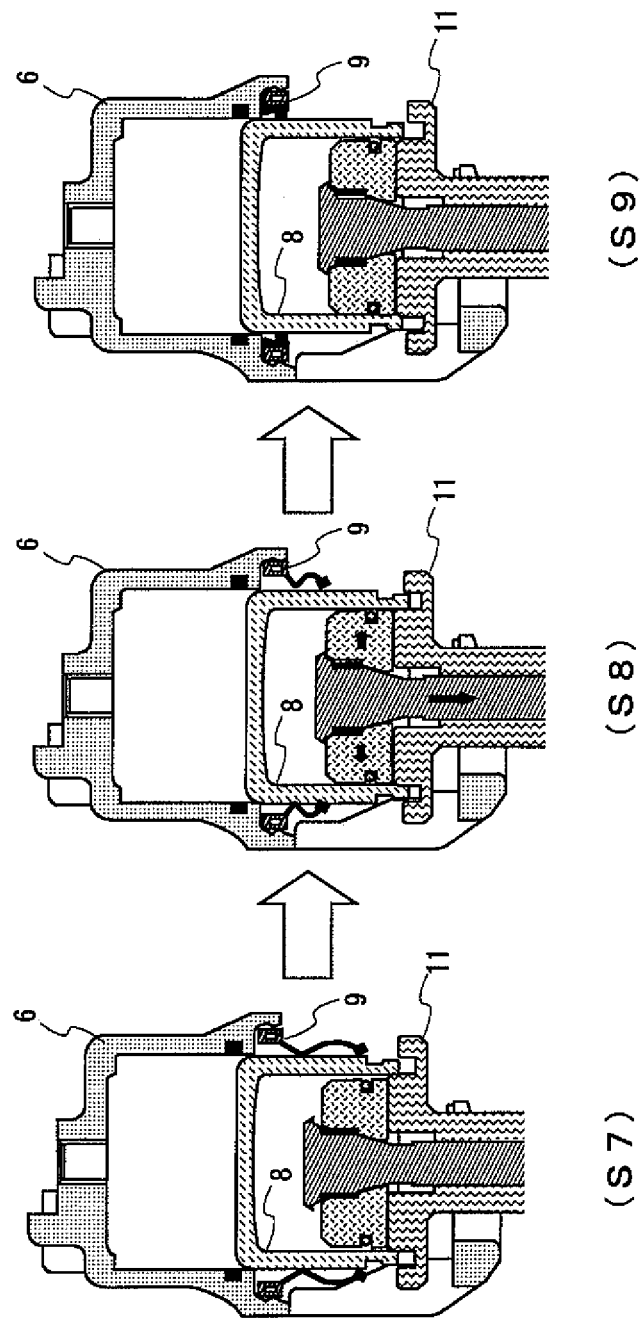
FIG. 12 is a view showing the steps for manufacturing the brake (S7 to S9).
Figure 13:
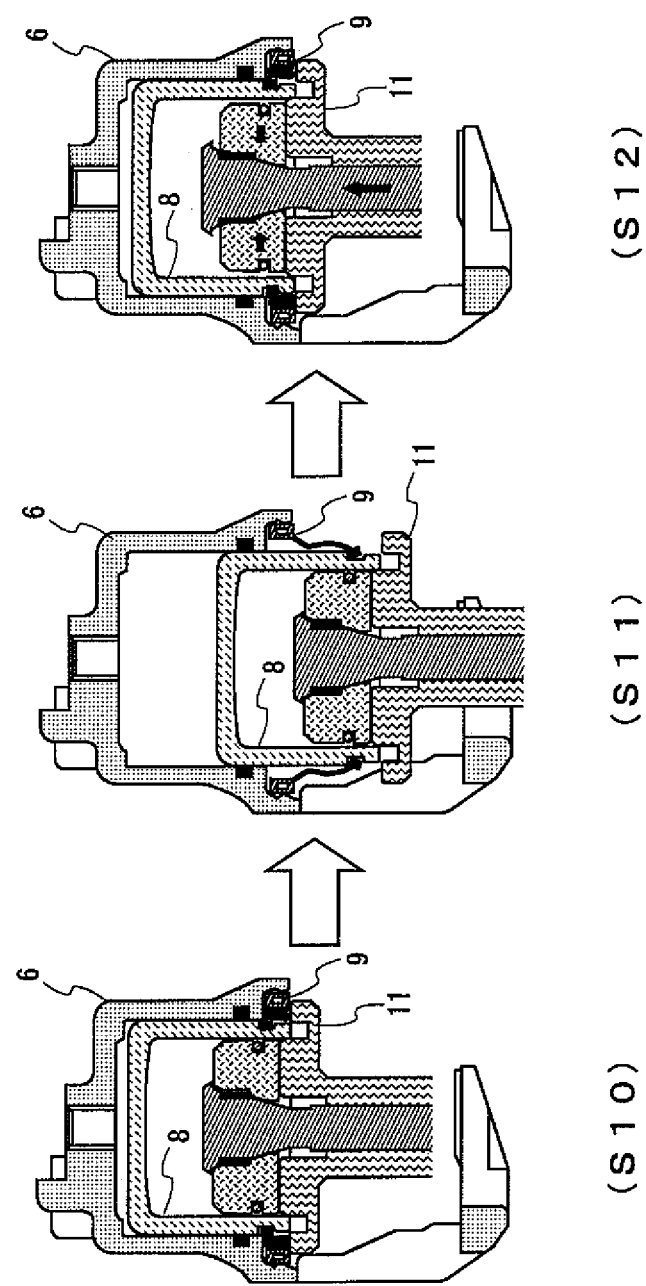
FIG. 13 is a view showing the steps for manufacturing the brake (S10 to S12).

Now, a process for manufacturing a brake employing the brake manufacturing apparatus 1 according to the embodiment will be described. Although a series of production steps as described below are sequentially carried out by the control computer (not shown) which is incorporated in the body part 2, the steps may be carried out by operation of a user. FIG. 9 is a flow chart showing the production process as described below. FIGS. 10 to 13 a reviews showing a series of the production steps as described below. A series of the production steps will be described, referring to FIGS. 9 to 13.

(Step S1) As a first step, parts of various types are set on the brake manufacturing apparatus 1. The cylinder body 6 having the piston 8 fitted into the cylinder inner diameter part 61 is set on the cylinder body supporting part 4, and at the same time, the waterproof and dustproof boot 9 is set on the collet chuck 11. On this occasion, the collet chuck 11 is in the unlatched state. Then, the collet chuck 11 having the waterproof and dustproof boot 9 set thereon is disposed below the piston 8, and the air controlling part 5 is connected to the inlet 62.

(Step S2) Then, the collet chuck 11 is pushed up with the jig actuating part 3. Accordingly, the waterproof and dustproof boot 9 is pushed upward, and the cylinder side fitting part 92 gradually intrudes into the cylinder groove 63. On this occasion, the taper faces 113A provided on the top 113 of the collet chuck 11 come into contact with the lower end of the inner peripheral wall face of the piston 8, whereby the collet chuck 11 is guided so that the center axis of the collet chuck 11 may be aligned with the center axis of the piston 8. In this manner, relative positioning between the cylinder side fitting part 92 of the waterproof and dustproof boot 9 and the cylinder groove 63 is performed. By further moving the collet chuck 11 upward, the upper face of the lip part 91 is brought into contact with the lower end of the piston 8, and pushed downward toward the flange portion 112D while sliding along the peripheral side face of the top 113 of the collet chuck 11. On this occasion, the bellow part 93 is contained in a space formed between the outer peripheral wall face of the piston 8 and the inner peripheral wall face of the skirt portion 112E, whereby the bellow part can be prevented from damage of itself.

(Step S3) Following the above described step S2, the collet chuck 11 is further pushed up by the jig actuating part 3, and the cylinder side fitting part 92 of the waterproof and dustproof boot 9 is press-fitted into the cylinder groove 63 to be completely fitted. Specifically, the top face of the cylinder side fitting part 92 gets in touch with the first top face 64 of the cylinder groove 63 due to pushing up the collet chuck 11. This restricts the movement of the cylinder side fitting part 92, and a repulsive force is transmitted to the jig actuating part 3 by way of the collet chuck 11. Detecting this repulsive force by a sensor (not shown), the jig actuating part 3 judges that the cylinder side fitting part 92 has been completely fitted into the cylinder groove 63, and stops the movement of the collet chuck 11.

(Step S4) After the jig actuating part 3 has stopped the collet chuck 11, detecting the repulsive force in the step S3, the jig actuating part 3 moves the collet chuck 11 downward, by reversing an upward direction to a downward direction. Because the holding projection 96 of the waterproof and dustproof boot 9 is fitted into the holding recess 65 of the cylinder body 6, and the metal ring 95 which is embedded in the cylinder side fitting part 92 urges the holding projection 96, the fitted state of the waterproof and dustproof boot 9 is maintained. Accordingly, even though the collet chuck 11 starts to move downward, and becomes free from holding the cylinder side fitting part 92 by means of the skirt portion 112E, the cylinder side fitting part 92 will not be detached from the cylinder groove 63, and the position is kept. Moreover, the lip part 91 moves downward following the downward movement of the collet chuck 11, because the inner peripheral face of the lip part 91 is butted against the outer peripheral face of the top 113. However, the downward movement of the lip part 91 is restricted by being pulled up by the cylinder side fitting part 92 which is engaged with the cylinder groove 63, because the lip part 91 is connected to the cylinder side fitting part 92 via the bellow part 93. According to the process in the steps S1 to S4, mounting of the waterproof and dustproof boot 9 to the cylinder side fitting part 92 is completed. The process in the steps S1 to S4 corresponds to the engaging step in the invention.

(Step S5) After the collet chuck 11 has been completely lowered, the jig actuating part 3 stops the collet chuck 11. Specifically, the collet chuck 11 is stopped in a state disposed below the piston 8. The collet chuck 11 is disposed at a position remote from the lower end of the cylinder inner diameter part 61 by a distance rather shorter than an entire length of the piston.

(Step S6) Then, the air controlling part 5 which is connected to the inlet 62 supplies the compressed air to the cylinder inner diameter part 61. Accordingly, the pressure of the compressed air is applied to the pressure receiving face 81 of the piston 8 thereby to move the piston 8 downward. On this occasion, the lip part 91 is pushed downward together with the piston 8, because it is in contact with the lower end face of the piston 8.

(Step S7) The piston 8 is further pushed down with the compressed air, and finally, comes into contact with the collet chuck 11 to be stopped. In this state, the bellow part 93 of the waterproof and dustproof boot 9 is gradually expanded with the push-down of the piston 8, and at last, its expanding allowance is lost. When the piston 8 keeps on moving downward, even after the bellow part 93 has been fully expanded, the bellow part 93 which has lost the expanding allowance pulls the lip part 91, and therefore, the downward movement of the lip part 91 which has been pushed down with the piston 8 is restricted. The lip part 91 which is restrained from the downward movement is pulled up by the bellow part 93 from the lower end of the piston 8 to the peripheral side face 82 of the piston 8. The lip part 91 which has been pulled up to the peripheral side face 82 of the piston 8 is further pulled up by the bellow part 93 and moves across the piston groove 84. The piston 8 which has been pushed down with the compressed air finally stops, getting in touch with the collet chuck 11. On this occasion, contact between the piston 8 and the seal 7 is released. Accordingly, the compressed air in the cylinder inner diameter part 61 flows toward the waterproof and dustproof boot 9 through a gap between the cylinder inner diameter part 61 and the piston 8. As the results, the waterproof and dustproof boot 9 is brought into a state where the compressed air is applied thereto.

In this state, the brake manufacturing apparatus 1 carries out the following inspection. Specifically, the control computer (not shown) which is incorporated in the body part 2 of the brake manufacturing apparatus 1 controls the air controlling part 5 to stop the supply of the compressed air, and at the same time, monitors a change of the air which has been supplied to the cylinder inner diameter part 61 of the cylinder body 6. After a determined time has passed since the air controlling part 5 stops the supply of the compressed air, the control computer judges that the waterproof and dustproof boot 9 is not in trouble, provided that the pressure of the air in the cylinder inner diameter part 61 is above a determined pressure, and proceeds to the next step. On the other hand, in case where the pressure of the air in the cylinder inner diameter part 61 is below the determined pressure, after the determined time has passed since the air controlling part 5 stops the supply of the compressed air, the control computer judges that the waterproof and dustproof boot 9 is in trouble, interrupts the production process, and announces with a display light or alarm that the waterproof and dustproof boot 9 is in trouble. In this case, "the determined time" means a time elapsed from the stop of the supply of the compressed air until a step for judging the abnormal pressure starts. For example, it is the time required until a temporary variation of the pressure due to the stop of supply of the compressed air is stabilized, and the pressure in the cylinder inner diameter part 61 is stabilized. Moreover, "the determined pressure" means the pressure maintained in the cylinder inner diameter part 61 after the determined time, in case where the waterproof and dustproof boot 9 is not in trouble. "The trouble in the waterproof and dustproof boot 9" means the state where the waterproof and dustproof boot 9 cannot sufficiently check powdery dust which is going to enter into the gap between the cylinder and the piston. For example, it means that the waterproof and dustproof boot 9 cannot sufficiently shield the gap between the piton 8 and the cylinder inner diameter part 61 because of presence of a hole in the bellow part 93 or a strange article caught between the cylinder side fitting part 92 and the cylinder groove 63 or between the lip part 91 and the piston groove 84.

(Step S8) In case where the waterproof and dustproof boot 9 is not in trouble, the air controlling part 5 sucks up the air in the cylinder inner diameter part 61 through the inlet 62, and decreases the pressure inside the cylinder inner diameter part 61 to at least below the atmospheric pressure. In this manner, the air pressure applied to the waterproof and dustproof boot 9 from the cylinder inner diameter part 61 is lost, whereby the bellow part 93 of the waterproof and dustproof boot 9 is contracted, and the lip part 91 is pulled upward. On this occasion, the piston 8 is retained by the collet chuck 11 which has been brought into the latched state in advance, and the upward movement of the piston 8 by air suction of the air controlling part 5 is restricted.

(Step S9) As the vacuum suction of the cylinder inner diameter part 61 by the air controlling part 5 further proceeds, the lip part 91 of the waterproof and dustproof boot 9 moves to the position of the cylinder groove 63. When the pressure inside the cylinder inner diameter part 61 has changed, or a determined time has passed since the start of the vacuum suction, the air controlling part 5 judges that the lip part 91 has moved up to the cylinder groove 63, and stops the vacuum suction.

(Step S10) After the vacuum suction by the air controlling part 5 has stopped, the jig actuating part 3 pushes the collet chuck 11 upward thereby to push the piston 8 into the cylinder inner diameter part 61. Although the lip part 91 of the waterproof and dustproof boot 9 which is in contact with the peripheral side face 82 of the piston 8 is pushed up so as to follow the movement of the piston 8, while the piston 8 is pushed up by the collet chuck 11, the upper face of the lip part 91 comes into contact with the first top face 64 of the cylinder groove 63, whereby the upward movement of the lip part 91 is restricted. In this manner, the lip part 91 is kept stopped at the position of the cylinder groove 63. As the results, the peripheral side face 82 of the piston 8 slides along the inner peripheral face of the lip part 91. When the piston 8 is brought into contact with the upper part of the cylinder inner diameter part 61 by the collet chuck 11, a repulsive force is transmitted to the jig actuating part 3. The jig actuating part 3 stops pushing up the collet chuck 11, detecting this repulsive force. As the results, the piston 8 is brought into a state completely pushed into the cylinder inner diameter part 61. It is to be noted that a space between the pressure receiving face 81 of the piston 8 and a ceiling face of the cylinder inner diameter part 61 is secured because of the step formed on the ceiling face of the cylinder inner diameter part 61, even in case where the piston 8 has been completely pushed into the cylinder inner diameter part 61. Therefore, when the air is introduced into the cylinder inner diameter part 61 via the inlet 62, the pressure receiving face 81 of the piston 8 fully receives the pressure of the compressed air, thereby to allow the piston 8 to be pushed down. When the piston 8 is pushed up to the limit position, the lip part 91 is fitted into the piston groove 84 of the piston 8. Specifically, the second peripheral wall face 85 of the piston groove 84 is comes into contact with the inner peripheral face of the lip part 91, the second bottom face 86 supports the bottom face of the lip part 91, and the second top face 87 supports the upper face of the lip part 91. Accordingly, when the piston 8 moves up and down, the vertical movement of the lip part 91 which is fitted into the piston groove 84 is restricted by the second bottom face 86 and the second top face 87, and hence, the lip part 91 moves together with the vertical movement of the piston 8. Although a space between the seal 7 and the waterproof and dustproof boot 9 is shielded from the exterior, when the piston 8 is fitted into the cylinder inner diameter part 61 in this step, inflation of the bellow part 93 due to the air reserved in the shielded space will not occur, because the cylinder inner diameter part 61 is subjected to vacuum suction in the aforesaid step S9.

(Step S11) Further, the piston 8 which has been pushed into the cylinder inner diameter part 61 is temporarily pulled down, for enabling the lip part 91 to be reliably fitted into the piston groove 84. Specifically, after the piston has been completely pushed up in the aforesaid step S10, the air controlling part 5 starts to supply the compressed air to the cylinder inner diameter part 61, and at the same time, the jig actuating part 3 moves the collet chuck 11 downward. In this manner, the piston 8 which has been deeply fitted in the cylinder inner diameter part 61 is pushed downward, and the bellow part 93 is expanded, whereby a tension of the bellow part 93 is transmitted to the lip part 91. Accordingly, even in case where the lip part 91 is not fully fitted into the piston groove 84, in the aforesaid step S10, the lip part 91 is moved by the tension of the bellow part 93, thereby to be completely fitted into the piston groove 84.

(Step S12) After the process of the aforesaid step S11 has been finished, the air controlling part 5 stops supplying the compressed air to the cylinder inner diameter part 61, and at the same time, the interior of the cylinder inner diameter part 61 is communicated with the outside air, so that the air pressure inside the cylinder inner diameter part 61 may be made equal to that of the atmospheric air. In this state, the jig actuating part 3 pushes the collet chuck 11 upward, and pushes the piston 8 into the cylinder inner diameter part 61. Then, the collet chuck 11 is brought into the unlatched state. When the process in the steps S1 to S12 as described above has been finished, the inspection and assembly of the waterproof and dustproof boot 9 is completed. The process in the steps S5 to S12 corresponds to the fitting process in the invention.

According to the apparatus and method for manufacturing the brake in the embodiment as described above, it is possible to carry out the assembly and inspection of the waterproof and dustproof boot in a series of steps. Particularly, because the waterproof and dustproof boot can be mechanically assembled, a manner of mechanically assembling is stabilized as compared with a case where it is assembled with man power, and it becomes possible to ship the disk brake having the waterproof and dustproof boot assembled, at high quality. Moreover, the inspection of the waterproof and dustproof boot has been conventionally carried out by spreading the bellows with a hand before it is assembled to the cylinder body, and presence or absence of any trouble has been confirmed only visually, by outlook inspection. However, according to the embodiment, a damage of the bellows or defective assembly can be inspected in the process of a series of assembling steps, and it is possible to remarkably improve the quality of the disk brake to which the waterproof and dustproof boot is assembled. It is needless to say that in case of omitting the inspection, the process of the inspection described in the step S7 may be omitted.

Figure 14:
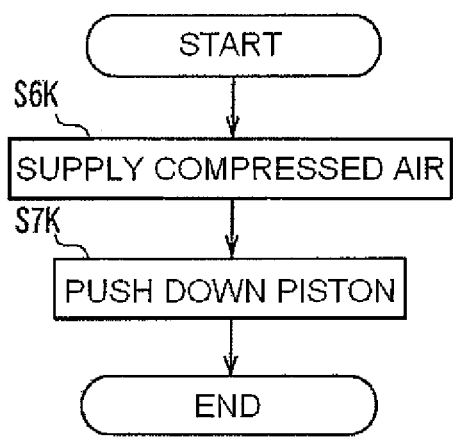
FIG. 14 is a flow chart showing steps for inspecting the brake.
Figure 15:
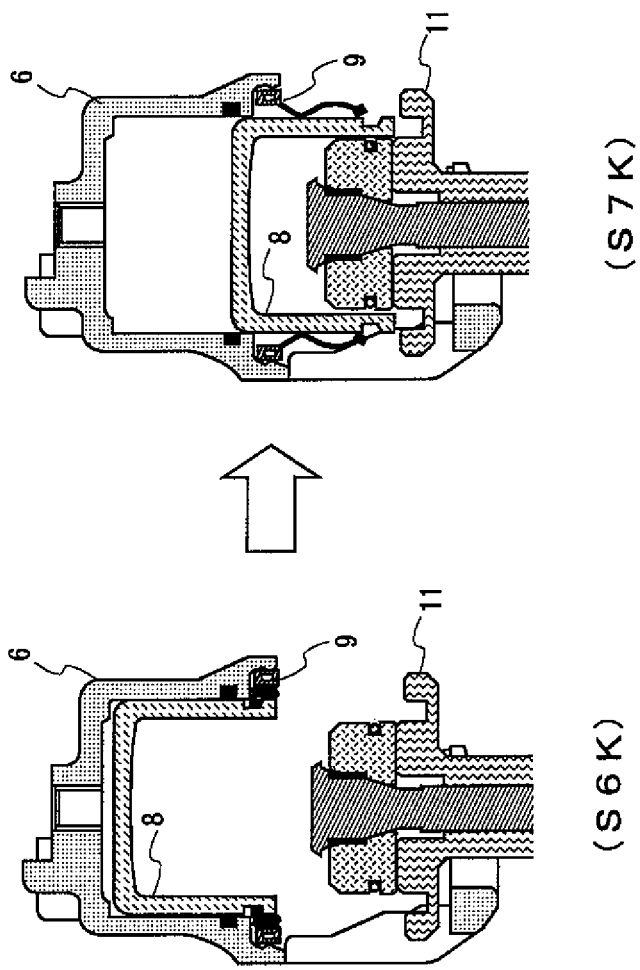
FIG. 15 is a view showing the steps for inspecting the brake.
Figure 16:
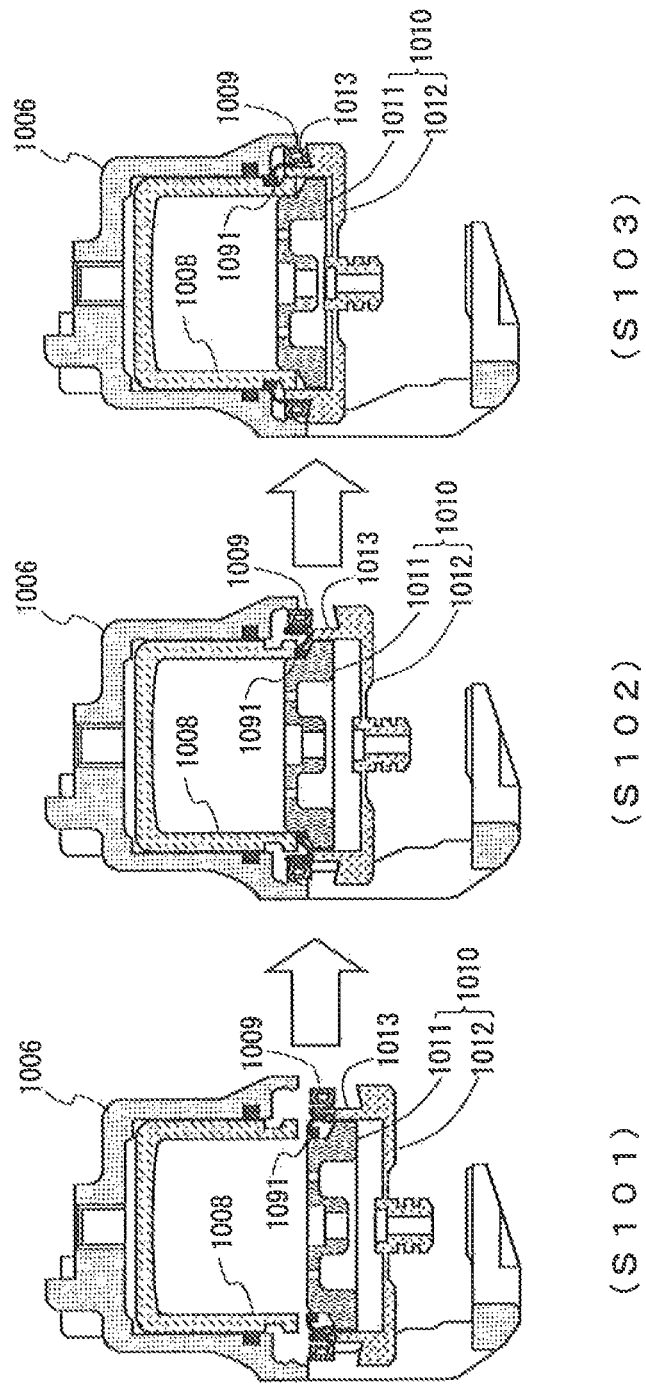
FIG. 16 is a view showing assembling steps according to conventional art (S101 to S103).
Figure 17:
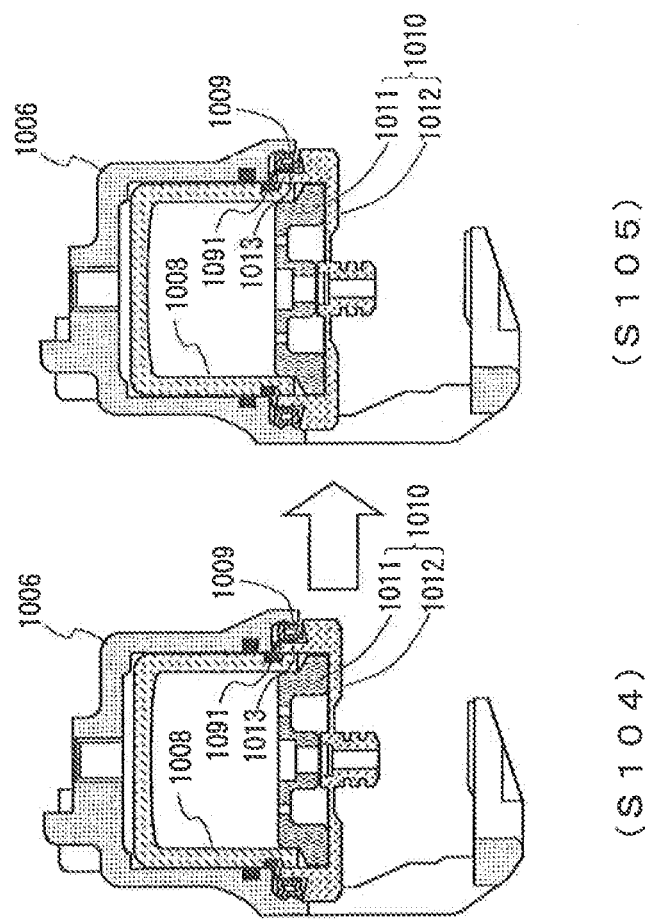
FIG. 17 is a view showing the assembling steps according to the conventional art (S104 to S105).

By the way, although the invention has been described with a viewpoint of the apparatus and method for manufacturing a brake in the above described embodiment, it is possible to regard the above described embodiment as an inspecting apparatus and an inspecting method. In case where the above described brake manufacturing apparatus 1 is regarded as the inspecting apparatus, the constituent elements are the same as the case of the manufacturing apparatus. Moreover, in case where a series of the brake manufacturing steps as described above are regarded as the inspecting method, the aforesaid steps S6 and S7 are necessary steps as the inspecting method, while the other steps S1 to S5 and S8 to S12 are unnecessary steps. FIG. 14 is a flow chart showing the necessary steps as the inspecting method, and operation of the inspecting apparatus, in case where the above described embodiment is regarded as the inspecting apparatus. It is to be noted that in FIG. 14, a sign K is added to the reference numerals S6 and S7 of the steps required as the inspecting method, for avoiding confusion with the reference numerals in FIG. 9. In case of inspecting the brake to which the waterproof and dustproof boot has been already assembled, the process in the steps S6 and S7 may be carried out, without carrying out the process in the aforesaid steps S1 to S5. In this case, the lip part 91 which has been fitted into the piston groove 84 is pulled by the bellow part 93 when the piston 8 is pushed down, and the lip part 91 is detached from the piston groove 84 to slide along the second peripheral wall face 85 (See FIG. 15). Contents of the other process are substantially the same as contents of the aforesaid steps S6 and S7. In case where this embodiment is regarded as the inspecting method, the process in the step S6 corresponds to the moving step in this invention, and the process in the step S7 corresponds to the judging step. Further, the air controlling part 5 corresponds to the moving means in the invention, and the control computer (not shown) which is incorporated in the body part 2 corresponds to the judging means.

While description has been made in connection with specific exemplary embodiment of the invention, it will be obvious to those skilled in the art that various changes and modification may be made therein without departing from the present invention. It is aimed, therefore, to cover in the appended claims all such changes and modifications falling within the true spirit and scope of the present invention.

[Description of Reference Numerals and Signs]
1 Brake manufacturing apparatus
2 Body part
3 Jig actuating part
4 Cylinder body supporting part
5 Air controlling part
6, 1006 Cylinder body
7 Seal
8, 1008 Piston
9, 1009 Waterproof and dustproof boot
11 Collet chuck

What is claimed is:

1. A method for manufacturing a brake, in which an annular boot which can be expanded and contracted according to movements of a piston is assembled to an opening part of a cylinder and to an annular groove on an outer peripheral face of the piston, the method comprising:
    engaging one end of the boot with the opening part of the cylinder in a state where the piston is contained in the cylinder;
    moving the piston so that at least a part of the piston is withdrawn front the cylinder and that the other end of the boot is pressed by a pressing face of the piston;
    fitting the other end of the boot into the annular groove of the piston, while a movable range of the other end of the boot is restricted by an expanding allowance of the boot whose one end is engaged with the opening part of the cylinder;
    pressurizing an inside of the cylinder until the piston is moved to be separated from an oil seal provided on the cylinder;
    monitoring a change of a pressure of the pressurized inside of the cylinder;
    judging presence or absence of a trouble of the boot based on the change of the pressure in the cylinder; and
    reversing a moving direction of the piston so that the other end of the boot is fitted into the annular groove of the piston.

2. A method for manufacturing a brake, in which an annular boot which can be expanded and contracted according to movements of a piston is assembled to an opening part of a cylinder and to an annular groove on an outer peripheral face of the piston, the method comprising:
    engaging one end of the boot with the opening part of the cylinder in a state where the piston is contained in the cylinder;
    moving the piston so that at least a part of the piston is withdrawn from the cylinder and that the other end of the boot is pressed by a pressing face of the piston;
    fitting the other end of the boot into the annular groove of the piston, while a movable range of the other end of the boot is restricted by an expanding allowance of the boot whose one end is engaged with the opening part of the cylinder; and
    reducing the pressure in the cylinder lower than the atmospheric pressure in a state where the piston is separated from an oil seal on the cylinder,
    wherein the other end of the boot is fitted into the annular groove of the piston by moving the piston after reducing the pressure in the cylinder, so that an inflation of the boot due to a pressure of the air remaining in a space between the boot and the oil seal is prevented.

3. The method according to claim 1, further comprising:
    reversing a moving direction of the piston after the piston is moved until the other end of the boot passes the annular groove, so that the other end of the boot is fitted into the annular groove of the piston.

4. The method according to claim 1, wherein the boot includes:
    a first annular part adapted to be fitted into the annular groove of the piston;
    a second annular part having a larger diameter than the first annular groove, and adapted to be engaged with the opening part of the cylinder; and
    an annular bellow part connecting the first annular part and the second annular part,
    wherein the first annular part is pressed by the pressing face of the piston by moving the piston and withdrawing the part of the piston is withdrawn from the cylinder, and
    wherein the first annular part is fitted into the annular groove of the piston, while the movable range of the first annular part is restricted by the expanding allowance of the boot in which the second annular part engaged with the opening part of the cylinder.

5. The method according to claim 2, further comprising:
reversing a moving direction of the piston after the piston is moved until the other end of the boot passes the annular groove, so that the other end of the boot is fitted into the annular groove of the piston.

6. The method according to claim 2, wherein the boot includes:
a first annular part adapted to be fitted into the annular groove of the piston;
a second annular part having a larger diameter than the first annular groove, and adapted to be engaged with the opening part of the cylinder; and
an annular bellow part connecting the first annular part and the second annular part,
wherein the first annular part is pressed by the pressing face of the piston by moving the piston and withdrawing the part of the piston is withdrawn from the cylinder, and
wherein the first annular part is fitted into the annular groove of the piston, while the movable range of the first annular part is restricted by the expanding allowance of the boot in which the second annular part engaged with the opening part of the cylinder.

* * * * *